United States Patent
Obert et al.

(10) Patent No.: US 9,976,061 B2
(45) Date of Patent: May 22, 2018

(54) BINDER COMPOSITION FOR MINERAL WOOL

(71) Applicant: SAINT-GOBAIN ISOVER, Courbevoie (FR)

(72) Inventors: Edouard Obert, Fleruines (FR); Lionel Kiefer, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 74 days.

(21) Appl. No.: 15/122,355

(22) PCT Filed: Mar. 2, 2015

(86) PCT No.: PCT/FR2015/050502
§ 371 (c)(1),
(2) Date: Aug. 29, 2016

(87) PCT Pub. No.: WO2015/132518
PCT Pub. Date: Sep. 11, 2015

(65) Prior Publication Data
US 2017/0029669 A1    Feb. 2, 2017

(30) Foreign Application Priority Data

Mar. 6, 2014   (FR) ...................................... 14 51826

(51) Int. Cl.
| | | |
|---|---|---|
| *C09J 103/02* | (2006.01) | |
| *C03C 13/06* | (2006.01) | |
| *C03C 25/321* | (2018.01) | |
| *C09D 103/02* | (2006.01) | |
| *D04H 1/42* | (2012.01) | |
| *D04H 1/58* | (2012.01) | |
| *D04H 1/64* | (2012.01) | |
| *D04H 1/4218* | (2012.01) | |
| *D04H 1/4209* | (2012.01) | |
| *D04H 1/587* | (2012.01) | |
| *C03C 25/32* | (2018.01) | |

(52) U.S. Cl.
CPC ............. *C09J 103/02* (2013.01); *C03C 13/06* (2013.01); *C03C 25/321* (2013.01); *C09D 103/02* (2013.01); *D04H 1/4209* (2013.01); *D04H 1/4218* (2013.01); *D04H 1/587* (2013.01); *D04H 1/64* (2013.01)

(58) Field of Classification Search
CPC ...... C09J 103/02; C03C 13/06; C03C 25/321; C09D 103/02; D04H 1/4209; D04H 1/4218; D04H 1/587; D04H 1/64
USPC ........................................................ 427/386
See application file for complete search history.

(56) References Cited

U.S. PATENT DOCUMENTS

| | | | |
|---|---|---|---|
| 2011/0223364 A1* | 9/2011 | Hawkins | ............. C03C 25/1095 428/34.5 |
| 2013/0026408 A1 | 1/2013 | Jaffrennou et al. | |
| 2014/0364029 A1 | 12/2014 | Hawkins et al. | |

FOREIGN PATENT DOCUMENTS

| | | | |
|---|---|---|---|
| AU | 2012288680 B2 * | 11/2015 | ........... C03C 25/321 |
| WO | WO 2013/014399 A1 | 1/2013 | |

OTHER PUBLICATIONS

International Search Report dated Jun. 10, 2015, in PCT/FR2015/050502 filed Mar. 2, 2015.

* cited by examiner

*Primary Examiner* — Ling Choi
*Assistant Examiner* — Ronald Grinsted
(74) *Attorney, Agent, or Firm* — Oblon, McClelland, Maier & Neustadt, L.L.P.

(57) ABSTRACT

The present invention relates to an aqueous sizing composition for insulating products based on mineral wool, comprising
(a) at least one saccharide chosen from reducing sugars and hydrogenated sugars, the proportion of hydrogenated sugars being between 25% and 100% by weight,
(b) at least one monomeric polycarboxylic acid or a salt or anhydride of such an acid,
(c) more than 2.0% by weight, relative to the sum of the components (a) and (b), of at least one epoxysilane.

14 Claims, No Drawings

BINDER COMPOSITION FOR MINERAL WOOL

The present invention relates to a sizing composition for insulating products based on mineral wool, in particular glass or rock wool, containing hydrogenated sugars, at least one polycarboxylic acid and a large amount of at least one epoxysilane.

The manufacture of insulating products based on mineral wool generally comprises a step of manufacturing glass or rock fibres via a centrifugation process. On their path between the centrifugation device and the fibre collection belt, an aqueous sizing composition, also known as a binder, is vaporized onto the fibres while still hot, and then undergoes a thermosetting reaction at temperatures of about 200° C.

The phenolic resins that have been used for several decades as binders are being increasingly replaced with products derived from is renewable sources and which emit very little or no formaldehyde, this compound being considered as possibly harmful to human health.

It is thus known, for example from US 2011/0223 364, to bind mineral fibres with formaldehyde-free aqueous sizing compositions containing, as heat-curable reagents, carbohydrates and polycarboxylic acids.

However, sizing compositions based on reducing sugars have the drawback of giving rise to colouring reactions (caramelization, Maillard reaction) which make it difficult, if not impossible, to obtain clear-coloured products.

The Applicant proposed in its patent applications WO 2010/029 266 and WO 2013/014 399 binders based, not on reducing sugars, but on hydrogenated sugars, also known as sugar alcohols. These reagents have considerably higher heat stability than reducing sugars and do not give rise to Maillard and/or caramelization reactions.

Insulating products based on mineral wool and on this new generation of "green" binders are, however, relatively hygroscopic and conserve their mechanical properties less well over time than the more coloured products manufactured with reducing sugars. To compensate for the loss of mechanical properties after a certain period of ageing of these insulating products, it is generally necessary to increase the proportion of binder by about 10% to 20%, which not only increases the cost of the final product, but also impairs its reaction to fire.

In the course of its investigations directed towards improving the mechanical properties of insulating products based on mineral wool sized with "colourless" binders, i.e. manufactured from hydrogenated sugars, the Applicant has found, surprisingly, that certain compounds, known as couplers, lead to a spectacular improvement of the mechanical properties of the insulating products obtained, on condition that they are used at concentrations higher than those required for their functioning as coupler.

It is widely known and very common practice to use functional silanes as couplers for improving the adhesion of organic materials to mineral surfaces such as glass. A functional silane generally comprises at least one, preferably two or three, hydrolyzable alkoxysilyl functions, which are capable of reacting with the silanol groups at the surface of glass, and at least one reactive function (oxirane, amine) borne by a non-hydrolyzable organic group, bonded to the silicon atom via an Si—C bond. This organic function is generally chosen so as to be able to react with the organic phase.

To obtain a satisfactory binder-glass coupling effect, it generally suffices to add less than 1% by weight (of solids) of coupler to the sizing composition. Admittedly, the prior art contains patent applications which envisage higher concentrations of coupler (see, for example, US 2011/0 223 364), but the preferred examples and embodiments generally mention concentrations close to 0.5%, which is certainly driven by the relatively high cost of these compounds.

The couplers that are the most widely used are aminosilanes. They are relatively cheaper than epoxysilanes and have, at neutral pH, a chemical stability that allows sizing compositions to be prepared a long time in advance.

Epoxysilanes are not only more expensive than aminosilanes, but also have the additional drawback in that the epoxy function becomes hydrolyzed quite rapidly in the presence of water, giving rise to a much less reactive diol.

The present invention is based on the quite surprising discovery that epoxysilanes, unlike aminosilanes, considerably improve the resistance to ageing of insulating products based on mineral wool and binders containing hydrogenated sugars, when they are used in concentrations above about 2% by weight.

The subject of the present invention is, consequently, an aqueous sizing composition for insulating products based on mineral wool, comprising
(a) at least one saccharide chosen from reducing sugars, hydrogenated sugars and a mixture thereof, the proportion of hydrogenated sugars in the saccharide being between 25% and 100% by weight,
(b) at least one monomeric polycarboxylic acid or a salt or anhydride of such an acid,
(c) more than 2.0% by weight, relative to the sum of the components (a) and (b), of at least one epoxysilane.

The component (a) of the sizing composition according to the invention may consist solely of hydrogenated sugars and be free of reducing sugars. This embodiment is advantageous since it leads to insulating products that are particularly sparingly coloured.

The term "saccharide" has herein a broader meaning than usually, since it encompasses not only saccharides in the strict sense, i.e. reducing sugars or carbohydrates of formula $C_n(H_2O)_p$ bearing at least one aldehyde or ketone group (reducing group), but also the products of hydrogenation of these carbohydrates in which the aldehyde or ketone group has been reduced.

In the present invention, the term "hydrogenated sugar" means all the products resulting from the reduction of a saccharide chosen from monosaccharides, disaccharides, oligosaccharides and polysaccharides and mixtures of these products.

The hydrogenated sugar is preferably a product of hydrogenation of a starch hydrolysate.

Starch hydrolysates are products obtained by enzymatic and/or acidic hydrolysis of starch. The degree of hydrolysis is generally characterized by the dextrose equivalent (DE), defined by the following relationship:

$$DE = 100 \times \left( \frac{\text{number of broken glycoside bonds}}{\text{number of glycoside bonds in the initial starch}} \right)$$

The preferred starch hydrolysates have, before the hydrogenation step, a DE of between 5 and 99 and advantageously between 10 and 80.

The hydrogenation of the saccharide may be performed via known methods working under conditions of high hydrogen pressure and high temperature, in the presence of a catalyst chosen from the elements of groups IB, IIB, IVB, VI, VII and VIII of the Periodic Table of the Elements, preferably from the group comprising nickel, platinum, palladium, cobalt and molybdenum, and mixtures thereof. The preferred catalyst is Raney nickel. The hydrogenation transforms the sugar or the mixture of sugars (starch hydrolysate) into polyols or sugar alcohols.

As examples of hydrogenated sugars, mention may be made of erythritol, arabitol, xylitol, sorbitol, mannitol, iditol, maltitol, isomaltitol, lactitol, cellobitol, palatinitol, maltotritol and the products of hydrogenation of starch hydrolysates.

The products of hydrogenation of starch hydrolysates will preferably be used.

Preferably, the hydrogenated sugar or the mixture of hydrogenated sugars consists predominantly, i.e. to more than 50% by weight, of maltitol (product of hydrogenation of maltose, a glucose dimer resulting from the enzymatic hydrolysis of starch).

In another embodiment, component (a) may contain up to 75% by weight of one or more reducing sugars, in addition to the hydrogenated sugar(s). The insulating products based on mineral wool obtained with a sizing composition having a certain content of reducing sugars are relatively more coloured, but may have a real economic interest associated with the low cost of reducing sugars or of mixtures of incompletely hydrogenated sugars.

The content of hydrogenated sugars of the saccharide (component (a)) is preferably at least equal to 30% by weight, in particular at least equal to 50% by weight and ideally at least equal to 70% by weight.

The reducing sugars encompass oses (monosaccharides) and osides (disaccharides, oligosaccharides and polysaccharides).

As examples of monosaccharides, mention may be made of those comprising from 3 to 8 carbon atoms, preferably aldoses and advantageously aldoses containing 5 to 7 carbon atoms. The aldoses that are particularly preferred are the natural aldoses (belonging to the D series), especially hexoses such as glucose, mannose and galactose.

Lactose or maltose are examples of disaccharides that may be used as reducing sugar.

The polysaccharides that may be used for the present invention preferably have a weight-average molar mass of less than 100 000, preferably less than 50 000 and advantageously less than 10 000.

Preferably, the polysaccharide contains at least one unit chosen from the abovementioned aldoses, advantageously glucose. Reducing polysaccharides which consist predominantly (to more than 50% by weight) of glucose units are particularly preferred.

The reducing sugar may especially be a mixture of monosaccharides, oligosaccharides and polysaccharides, especially a dextrin.

Dextrins are compounds corresponding to the general formula $(C_6H_{10}O_5)_n$. They are obtained by partial hydrolysis of starch. Their DE is advantageously between 5 and 99 and preferably between 10 and 80.

Component (a), namely the saccharide consisting of hydrogenated sugars optionally mixed with reducing sugars, advantageously represents from 30% to 70% by weight and preferably from 40% to 60% by weight of solids of the sizing composition.

Component (b) is a monomeric polycarboxylic acid. It may be a dicarboxylic, tricarboxylic or tetracarboxylic acid.

The dicarboxylic adds include, for example, oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and derivatives thereof, especially containing at least one boron or chlorine atom, tetrahydrophthalic acid and derivatives thereof, especially containing at least one chlorine atom such as chlorendic acid, isophthalic acid, terephthalic acid, mesaconic acid and citraconic acid;

The tricarboxylic acids include, for example, citric acid, tricarballylic acid, 1,2,4-butanetricarboxylic acid, aconitic acid, hemimellitic acid, trimellitic acid and trimesic acid;

Examples of tetracarboxylic acids that may be mentioned include 1,2,3,4-butanetetracarboxylic acid and pyromellitic acid.

Citric acid will preferably be used.

Component (b), namely the monomeric polycarboxylic acid, advantageously represents from 30% to 70% by weight and preferably from 40% to 60% by weight of solids of sizing composition of the present invention.

The weight ratio of component (a) to component (b) is preferably between 70/30 and 30/70 and in particular between 60/40 and 40/60.

As explained in the introduction, the presence of a high concentration of an epoxysilane is an essential technical characteristic of the present invention.

The sizing composition of the present invention advantageously contains from 2.1% to 7% by weight, preferably from 2.3% to 6% by weight, in particular from 2.5% to 5% by weight and ideally from 3% to 4.5% by weight of at least one epoxysilane, these percentages being expressed relative to the sum of components (a) and (b).

The higher the content of epoxysilanes, the more appreciable the anti-ageing effect. The relatively high cost of epoxysilanes leads, however, to limiting the amounts of epoxysilanes used.

It is, however, probable that the increase in the cost price of the sizing composition, resulting from the use of high concentrations of an epoxysilane, is compensated for by the possibility of using less sizing composition.

The epoxysilanes of the present invention may be trialkoxysilanes or dialkoxysilanes, i.e. they may comprise two or three alkoxy functions that may be hydrolyzed to silanol functions. Trialkoxysilanes are particularly preferred.

The alkoxy groups are advantageously methoxy or ethoxy groups, methoxy groups, which are more reactive than ethoxy groups, being preferred.

The epoxysilane used in the present invention to improve the ageing resistance of insulating products based on mineral wool bound by binders based on hydrogenated sugars is advantageously chosen from the group formed by 3-glycidyloxypropyl-trialkoxysilanes, 3-glycidoxypropyl-dialkoxy-alkylsilanes, epoxycyclohexylethyltrialkoxy-silanes and epoxycyclohexylethyl-dialkoxyalkyl-silanes.

The 3-glycidyloxypropyl-trialkoxysilanes are particularly advantageous and, among these, the Applicant has obtained excellent results with (3-glycidyloxypropyl)trimethoxysilane, sold, for example, under the name GLYMO by the company Evonik, under the name Z-6040 by the company Dow Corning or under the reference OFS-6040 by the company Xiameter.

The sizing composition may also comprise a catalyst which may be chosen from Lewis bases and Lewis acids, such as clays, colloidal or non-colloidal silica, organic amines, quaternary ammoniums, metal oxides, metal sulfates, metal chlorides, urea sulfates, urea chlorides and silicate-based catalysts.

The catalyst may also be a compound containing phosphorus, for example an alkali metal hypophosphite, an alkali metal phosphate, an alkali metal polyphosphate, an alkali metal hydrogen phosphate, a phosphoric acid or an alkylphosphonic acid. Preferably, the alkali metal is sodium or potassium.

The catalyst may also be a compound containing fluorine and boron, for example, tetrafluoroboric acid or a salt of this acid, especially a tetrafluoroborate of an alkali metal such as sodium or potassium, a tetrafluoroborate of an alkaline-earth metal such as calcium or magnesium, a zinc tetrafluoroborate and an ammonium tetrafluoroborate.

Preferably, the catalyst is sodium hypophosphite, sodium phosphite or a mixture of these compounds.

The amount of catalyst introduced into the sizing composition generally represents not more than 20% by weight and advantageously from 1% to 10% by weight relative to the total weight of components (a) and (b).

The sizing composition in accordance with the invention may also comprise the conventional additives below in the following propoprtions calculated on the basis of 100 parts by weight of component (a)+(b):

from 0 to 40 parts and preferably from 4 to 25 parts of an oil or oil emulsion, from 0 to 5 parts of a hydrophobic agent, in particular a silicone, from 0 to 20 parts of a polyol other than the hydrogenated sugars, from 0 to 30 parts and preferably 0 to 20 parts of urea, from 0 to 30 parts of an extender chosen from lignin derivatives such as ammonium lignosulfonate (ALS) or sodium lignosulfonate, and animal or plant proteins.

The role of the additives is known and briefly recalled:

The oils are anti-dust agents and hydrophobic agents; urea acts as a plasticizer and also makes it possible to adjust the gel time of the sizing composition so as to avoid pregelation problems; the extender is an organic filler that is soluble or dispersible in the sizing composition, which makes it possible especially to reduce the cost thereof.

The hydrophobic agent is preferably a reactive silicone, i.e. a polydiorganosiloxane bearing at least one hydroxyl (silanol), carboxyl, anhydride, amine, epoxy or vinyl function capable of reacting with at least one of the constituents of the sizing composition and/or with the silanol groups of the surface of glass.

The reactive silicone is preferably liquid at room temperature. Its average molar mass is generally less than or equal to 50 000 and preferably less than or equal to 10 000.

Preferably, the reactive silicone comprises a reactive function, advantageously a silanol function, at each of its chain ends.

The reactive function of the reactive silicone may be blocked with a protecting group that releases the said reactive function under the effect of heat. The proportion of reactive silicone in the sizing composition generally ranges from 0.1 to 5 parts, preferably from 0.3 to 3 parts, advantageously from 0.5 to 2.5 parts and better still from 0.7 to 1.8 parts by weight per 100 parts by weight of the sum of components (a) and (b).

The preparation of the sizing composition is performed by simple mixing of the abovementioned constituents with water.

The sizing composition is intended to be applied to mineral fibres, especially glass or rock fibres.

A subject of the present invention is also a process for manufacturing an insulating product based on mineral wool, comprising the application of an aqueous sizing composition as described above to mineral wool fibres, and the evaporation of the solvent phase of the aqueous sizing composition and thermal setting of the non-volatile residue of the composition.

Conventionally, the sizing composition is projected by spraying onto the mineral fibres at the outlet of the centrifugal device and before they are collected on the receiving member in the form of a lap of fibres which is then treated at a temperature allowing the crosslinking of the sizing and the formation of an unmeltable binder. The crosslinking of the sizing according to the invention takes place at a temperature comparable to that of a standard phenol-formaldehyde resin, at a temperature of greater than or equal to 110° C., preferably greater than or equal to 130°, and advantageously greater than or equal to 140° C.

The high reactivity of the epoxysilane prevents the preparation of a sizing composition a long time in advance. In a preferred embodiment, the process of the present invention consequently comprises a step of preparing the aqueous sizing composition, less than 24 hours, preferably less than 4 hours, in particular less than 1 hour and ideally less than 15 minutes before the step of application to the fibres, the epoxysilane preferably being mixed with the aqueous sizing composition containing all the other ingredients.

The sizing composition advantageously has a pH of between 2 and 4, in particular between 2.5 and 3.5 and ideally close to 3.

The acoustic and/or heat insulating products obtained via the process according to the invention from these sized fibres also constitute a subject of the present invention.

These products are generally in the form of a mattress or felt of glass or rock mineral wool, or alternatively a web of mineral fibres, also glass or rock fibres, intended especially for forming a surface coating of the said mattress or of the said felt. When component (a) contains a very small proportion of reducing sugars, the products have a particularly advantageous white colour.

In addition, the insulating products have great resistance to the development of microorganisms, especially moulds, which is due to the non-fermentable nature of the hydrogenated sugars.

EXAMPLE 1

Binder Based on Hydrogenated Sugars

Sizing compositions comprising the constituents given in Table 1, expressed in parts by weight, are prepared.

The sizing compositions are prepared by introducing, into a container, water (about 80% of the final composition), the hydrogenated sugar (maltitol syrup), citric acid, sodium hypophosphite (catalyst), the anti-dust oil emulsion, the silicone emulsion and, finally, the epoxysilane (or the comparative aminosilane) with vigorous stirring until the constituents have fully dissolved.

The glass wool is manufactured by the technique of internal centrifugation in which the molten glass composition is transformed into fibres by means of a tool known as a "centrifugation plate", comprising a basket forming a chamber for receiving the molten composition and a peripheral strip pierced with a multitude of orifices: the plate is driven in rotation about its axis of symmetry arranged vertically, the composition is ejected through the orifices under the effect of the centrifugal force and the material escaping from the orifices is drawn into fibres with the assistance of a stream of drawing gas.

Conventionally, a sizing spraying crown is arranged below the fibre-drawing plate so as to regularly distribute the sizing composition over the glass wool that has just been formed.

The mineral wool thus sized is collected on a conveyor belt equipped with internal suction plenums which retain the mineral wool in the form of a felt or a lap at the surface of the conveyor. The conveyor then circulates in an oven maintained at 270° C. where the sizing constituents polymerize to form a binder. The insulating product obtained has a nominal density equal to 17.5 kg/m³, a nominal thickness of about 75 mm and a loss on ignition of the order of 5%.

The properties of the sizing compositions given in Table 1 below are evaluated in comparison with a standard sizing composition containing a phenol-formaldehyde resin and urea (Reference) prepared in accordance with Example 2, test 1 of WO 01/96254 A1.

The tensile strength is measured according to standard ASTM C 686-71T on a sample cut out by stamping from the insulating product. The sample is in the form of a ring 122 mm long, 46 mm wide, a radius of curvature of the cut of the outer edge equal to 38 mm and a radius of curvature of the cut of the inner edge equal to 12.5 mm.

The sample is placed between two cylindrical mandrels of a testing machine, one of which is mobile and moves at a constant speed. The breaking force F of the sample is measured and the tensile strength TS, defined by the ratio of the breaking force F (in newtons) to the mass of the sample (in grams), is calculated.

The tensile strength is measured immediately after manufacture (initial tensile strength) and after accelerated ageing in an autoclave at a temperature of 105° C. at 100% relative humidity for 15 minutes.

The "regain in thickness" indicates the compressive elastic modulus of the final product. To measure it, a compression pressure is applied, for a given time, such that the thickness is reduced to 1/4.8 of its initial value. After releasing this compression pressure, the thickness is again measured. The regain in thickness is the ratio of the measured thickness after release of the compression pressure to the initial thickness.

TABLE 1

| | Sample | | | | |
|---|---|---|---|---|---|
| | 1 | 2 | 3 | 4* | Reference |
| Phenolic resin R225 | — | — | — | — | 100 |
| Hydrogenated sugar (Maltilite ® 5575) | 48 | 48 | 48 | 48 | — |
| Citric acid | 52 | 52 | 52 | 52 | — |
| Sodium hypophosphite | 5 | 5 | 5 | 5 | — |
| Anti-dust oil emulsion (HydroWax ® 88) | 9.5 | 9.5 | 9.5 | 9.5 | 9.5 |
| Ammonium sulfate | — | — | — | — | 3 |
| Silicone emulsion (DC1581) | 2.1 | 2.1 | 2.1 | 2.1 | — |
| Aminosilane | 0.5 | — | — | — | 0.5 |
| Epoxysilane (GLYMO ®) | — | 0.5 | 1.5 | 3 | — |
| TS (in N/g) | | | | | |
| Before ageing | 4.5 | 4.3 | 4.5 | 5.0 | 5.0 |
| After ageing | 2.9 | 3.1 | 3.6 | 4.2 | 4.4 |
| Loss on ignition | 5.2 | 5.2 | 5.2 | 5.2 | 4.7 |
| Regain in thickness (%) | | | | | |
| After 1 hour | 108 | 106 | — | 106 | 107 |
| After 30 days | 98 | 97 | 96 | 96 | 102 |

*according to the invention

It may be seen that the tensile strength of sample 4 prepared in accordance with the invention has a tensile strength before ageing equivalent to that of the reference sample, whereas all the comparative samples (Nos. 1-3) have tensile strengths before ageing which are at least 10% less than those of the reference sample.

Moreover, the loss of tensile strength after ageing is significantly lower for the sample according to the invention than for the three comparative samples.

These results show that the use of a high concentration of an epoxysilane (3% of GLYMO) makes it possible to significantly reduce the loss of tensile strength of an insulating product prepared with a binder based solely on hydrogenated sugars.

The value of the regain in thickness does not appear to depend on the concentration of the epoxysilane.

EXAMPLE 2

Binder Based on Hydrogenated Sugars and Reducing Sugars

The process is performed in the manner described in Example 1, but using, as saccharide, a mixture of a hydrogenated sugar (maltitol syrup) and of a reducing sugar (glucose syrup). Table 2 specifies the weight fractions of the sizing compositions used and the mechanical properties of the mineral wool samples obtained.

TABLE 2

| | Sample | | | | | | | |
|---|---|---|---|---|---|---|---|---|
| | 5 | 6 | 7 | 8 | 9 | 10 | 11* | 12* |
| Reducing sugar (Roclys ® C3072S) | 31 | 31 | 31 | 31 | 31 | 31 | 31 | 31 |
| Hydrogenated sugar (Maltilite ® 5575) | 24 | 24 | 24 | 24 | 24 | 24 | 24 | 24 |
| Citric acid | 45 | 45 | 45 | 45 | 45 | 45 | 45 | 45 |
| Sodium hypophosphite | 5 | 5 | 5 | 5 | 5 | 5 | 5 | 5 |
| Oil emulsion (HydroWax ® 88) | 9.5 | 9.5 | 9.5 | 9.5 | 9.5 | 9.5 | 9.5 | 9.5 |
| Silicone emulsion (DC1581) | 2.1 | 2.1 | 2.1 | 2.1 | 2.1 | 2.1 | 2.1 | 2.1 |
| Aminosilane | 0.5 | 1 | 2 | 3 | — | — | — | — |
| Epoxysilane | — | — | — | — | 0.5 | 1 | 2.1 | 3 |

TABLE 2-continued

|  | Sample | | | | | | | |
| --- | --- | --- | --- | --- | --- | --- | --- | --- |
|  | 5 | 6 | 7 | 8 | 9 | 10 | 11* | 12* |
| TS (in N/g) | | | | | | | | |
| Before ageing | 4.3 | 4.3 | 4.1 | 4.1 | 4.3 | 4.2 | 4.3 | 4.5 |
| After ageing | 3.1 | 3.4 | 3.4 | 3.2 | 3.4 | 3.1 | 3.6 | 3.7 |
| Loss on ignition | 5.2 | 5.2 | 5.2 | 5.2 | 5.2 | 5.2 | 5.2 | 5.2 |
| Regain in thickness (%) | | | | | | | | |
| After 1 hour | 103 | 107 | 108 | 108 | 106 | 104 | 107 | 107 |
| After 30 days | 91 | 93 | 94 | 97 | 97 | 97 | 99 | 96 |

*according to the invention

It is found that the tensile strength of the samples prepared in accordance with the invention (Nos. 11 and 12) is better both before ageing and after ageing, in comparison with samples containing less epoxysilane (Nos. 9 and 10), but also in comparison with samples containing an equivalent amount of an aminosilane (Nos. 7 and 8).

As already stated in Example 1, the regain in thickness values for the final products appear to be independent of the chemical nature and concentration of the silane.

The invention claimed is:

1. An aqueous sizing composition for insulating products based on mineral wool, the aqueous sizing composition comprising:
   (a) at least one saccharide selected from the group consisting of a reducing sugar, a hydrogenated sugar and a mixture thereof, a proportion of hydrogenated sugars in the saccharide being between 25% and 100% by weight;
   (b) at least one monomeric polycarboxylic acid or a salt or anhydride thereof; and
   (c) more than 2.0% by weight, relative to a sum of the components (a) and (b), of at least one epoxysilane.

2. The aqueous sizing composition according to claim 1, comprising from 2.1% to 7% by weight of the at least one epoxysilane, relative to the sum of the components (a) and (b).

3. The aqueous sizing composition according to claim 1, wherein the epoxysilane is selected from the group consisting of a 3-glycidoxypropyltrialkoxysilane, a 3-glycidoxypropyldialkoxyalkylsilane, an epoxycyclo-hexylethyltrialkoxysilane and an epoxycyclohexylethyldialkoxyalkylsilane.

4. The aqueous sizing composition according to claim 1, wherein the saccharide comprises at least 30% by weight of hydrogenated sugars.

5. The aqueous sizing composition according to claim 1, comprising a hydrogenated sugar that is a hydrogenation product of a monosaccharide, a disaccharide, an oligosaccharide, a polysaccharide, or a mixture thereof.

6. The aqueous sizing composition according to claim 1, comprising a hydrogenated sugar that is a hydrogenation product of a starch hydrolysate.

7. The aqueous sizing composition according to claim 1, wherein the monomeric polycarboxylic acid is citric acid.

8. A process for manufacturing an insulating product based on mineral wool, the process comprising:
   applying the an aqueous sizing composition according to claim 1 to mineral wool fibres; and
   evaporating a solvent phase of the aqueous sizing composition and thermal setting a non-volatile residue of the composition.

9. The process according to claim 8, further comprising:
   preparing the aqueous sizing composition, less than 24 hours before the applying of the aqueous sizing composition to the fibres.

10. An acoustic and/or heat insulating product obtained by the process according to claim 8.

11. The aqueous sizing composition according to claim 1, comprising at least 2.3% by weight of the at least one epoxysilane, relative to the sum of the components (a) and (b).

12. The aqueous sizing composition according to claim 1, comprising at least 2.5% by weight of the at least one epoxysilane, relative to the sum of the components (a) and (b).

13. The aqueous sizing composition according to claim 1, comprising from 2.3% to 7% by weight of the at least one epoxysilane, relative to the sum of the components (a) and (b).

14. The aqueous sizing composition according to claim 1, comprising from 2.5% to 7% by weight of the at least one epoxysilane, relative to the sum of the components (a) and (b).

* * * * *